(12) United States Patent
Ushio et al.

(10) Patent No.: US 7,304,832 B2
(45) Date of Patent: Dec. 4, 2007

(54) CERAMIC CONTAINER AND BATTERY AND ELECTRIC DOUBLE LAYER CAPACITOR USING THE SAME

(75) Inventors: Yoshihiro Ushio, Shiga (JP); Kiyotaka Yokoi, Shiga (JP); Manabu Miyaishi, Shiga (JP); Masakazu Yasui, Ayabe (JP)

(73) Assignee: Kyocera Corporation, Kyoto (JP)

( * ) Notice: Subject to any disclaimer, the term of this patent is extended or adjusted under 35 U.S.C. 154(b) by 94 days.

(21) Appl. No.: 11/362,544

(22) Filed: Feb. 23, 2006

(65) Prior Publication Data

US 2006/0187614 A1 Aug. 24, 2006

(30) Foreign Application Priority Data

Feb. 23, 2005 (JP) ............................ P2005-047786
May 27, 2005 (JP) ............................ P2005-156300
Nov. 25, 2005 (JP) ............................ P2005-340440

(51) Int. Cl.
*H01G 9/00* (2006.01)
*H01G 2/10* (2006.01)
*H01G 9/08* (2006.01)

(52) U.S. Cl. .................. 361/502; 361/517; 361/535; 429/176

(58) Field of Classification Search ................ 361/502, 361/517–520, 535–538; 429/175–176
See application file for complete search history.

(56) References Cited

U.S. PATENT DOCUMENTS 6,445,566 B2 * 9/2002 Watanabe et al. ........... 361/502

| | | | |
|---|---|---|---|
| 7,079,376 B2 * | 7/2006 | Tatezono et al. ............ | 361/502 |
| 2001/0012193 A1 * | 8/2001 | Watanabe et al. ........... | 361/502 |
| 2004/0157121 A1 | 8/2004 | Watanabe et al. | |
| 2005/0037258 A1 * | 2/2005 | Itoh et al. ................... | 429/175 |
| 2005/0213284 A1 * | 9/2005 | Tatezono et al. ............ | 361/502 |
| 2006/0035143 A1 * | 2/2006 | Kida et al. .................. | 429/185 |
| 2007/0014076 A1 * | 1/2007 | Omura et al. ............... | 361/502 |

FOREIGN PATENT DOCUMENTS

JP       2004-227959       8/2004

* cited by examiner

*Primary Examiner*—Eric Thomas
(74) *Attorney, Agent, or Firm*—Hogan & Hartson LLP

(57) ABSTRACT

A ceramic container includes a ceramic base having a hollow or open portion for accommodating a battery element or an electric double layer capacitor element, defined by a bottom portion and a side wall which surrounds a bottom surface of the bottom portion which bottom face faces the hollow or open portion, a ceramic coating layer formed on a periphery of the bottom face along an inner face of the side wall, a first metallized layer extending, on the bottom face, from a portion provided immediately under the side wall to an inside of an inner end of the ceramic coating layer via a portion provided immediately under the ceramic coating layer, and a conductive layer formed on the bottom face in order to cover an extended portion of the first metallized layer and the ceramic coating layer.

10 Claims, 8 Drawing Sheets

US 7,304,832 B2

CERAMIC CONTAINER AND BATTERY AND ELECTRIC DOUBLE LAYER CAPACITOR USING THE SAME

BACKGROUND OF THE INVENTION

1. Field of the Invention

The present invention relates to a ceramic container for a rechargeable battery and an electric double layer capacitor, and a battery and electric double layer capacitor using the same, and more particularly to a battery and an electric double layer capacitor which are used as a slim-type battery for a small-sized electronic apparatus such as a cellular phone, a backup power supply for a semiconductor memory, a spare power source for a small-sized electronic apparatus and the like, and a ceramic container used therefor.

2. Description of the Related Art

In recent years, the rapid development of portable apparatuses typified by a cellular phone, a mobile computer, a videotape recorder with an integrated camera and so on, has increased the need for reduced size and weight. At the same time, the demand for an increase in battery power has been increased research on size and weight reductions while increasing the energy density of the battery. In particular, since a lithium battery is a battery using lithium having a small atomic weight and a high ionization energy, in order to realize such a battery that a high energy density can be obtained and a size and a weight can be reduced, and furthermore, recharging can be carried out, research for lithium batteries has been increasing, and now, and lithium batteries have been used in various applications such as a power source for a portable apparatus.

Moreover, an electric double layer capacitor has such a structure that positive and negative charges are arranged opposite to each other at a very short distance over an interface where two different phases (for example, a solid electrode and an electrolyte) come in contact with each other, and is an electric element capable of charging and discharging an electrical energy by utilizing an adsorbing layer of an ion in the electrolyte formed on a surface of a carbon material such as graphite, boronated graphite, active carbon or coke for a positive electrode material and a negative electrode material, that is, an electrostatic adsorbing and desorbing action of an ion in an electric double layer formed on the surface of the carbon material such as graphite for the positive electrode material and the negative electrode material. An inner part of the electric double layer capacitor is constituted by a separator composed of a nonwoven fabric formed of a polyolefin fiber or a fine porous film formed of polyolefin, two polarizable electrodes each formed of a carbon material and disposed by interposing the separator therebetween, and the electrolyte, The electric double layer capacitor is classified into two types of an organic solution type and a solution type, depending on a difference in the electrolyte.

Thus, the electric double layer capacitor utilizes the storage of the electric charges in the electric double layer formed on the interface of the two polarizable electrodes and the electrolyte. Therefore, it is possible to store a very large electric charge corresponding to a surface area of the polarizable electrode until an electrolysis of the electrolyte is generated by exceeding a withstand voltage.

In an electric double layer capacitor using the organic solution type, particularly, a driving voltage can be set to be 2 to 4 times as high as that of an electric double layer capacitor of the solution type using a solution such as aqueous sulfuric acid in the electrolyte. An electrical energy E which can be stored is expressed in $E=CV^2/2$, wherein a voltage is represented by V and a capacity is represented by C. Therefore, a high energy density can be obtained.

In recent years, there has been proposed a slim-type secondary battery and an electric double layer capacitor in which a battery element or an electric double layer capacitor element constituted by a positive electrode (or a first polarizable electrode), a negative electrode (or a second polarizable electrode) and a separator and an electrolyte shown in FIG. 8 are accommodated in a ceramic base.

The conventional secondary battery or electric double layer capacitor has a ceramic base 11, a lid 15, a positive electrode B-1 or a first polarizable electrode B-1, a negative electrode B-2 or a second polarizable electrode B-2, a separator B-3 and an electrolyte B-4 as shown in FIG. 8. The ceramic base 11 has a hollow or open portion formed by a side wall and a bottom portion. In the ceramic base 11, a first metallized layer 12a is formed on a bottom face facing the hollow or open portion of the bottom portion, and a second metallized layer 12b is formed on an upper surface of the side wall facing the hollow or open portion. Furthermore, the ceramic base 11 is formed of sintered alumina and so on. The lid 15 is formed of a metal such as an iron (Fe)—nickel (Ni)—cobalt (Co) alloy. A container is constituted basically by this ceramic base 11 and this lid 15. The secondary battery or the electric double layer capacitor has a sealing type structure in which an element including the positive electrode B-1 or the first polarizable electrode B-1, the negative electrode B-2 or the second polarizable electrode B-2 and the separator B-3 impregnated with the electrolyte B-4 which separator is interposed between the electrodes is disposed in this container and between the first metallized layer 12a and the lid 15. Charging and discharging in the metallized layer 12a and the lid 15 are carried out through first and second electrodes C and D formed on a lower surface of the ceramic base 11 (for example, see Japanese Unexamined Patent Publication JP-A 2004-227959 (Pages 4 to 6 and FIG. 1).

In a battery or an electric double layer capacitor using the ceramic base 11 shown in FIG. 8, ceramics is excellent in a chemical resistance. Therefore, the ceramic base 11 is hard to be damaged by the electrolyte B-4 containing an organic solvent or acid and an impurity dissolved from the ceramic base 11 can be prevented from being mixed into the electrolyte B-4 to deteriorate the electrolyte B-4. Thus, the good performance of the battery or the electric double layer capacitor can be maintained.

However, there is a problem in that the use of the electrolyte B-4 having a high performance causes a component of the first metallized layer 12a to be dissolved into the electrolyte B-4, thereby deteriorating the electrolyte B-4 and degrading the performance of the battery or the electric double layer capacitor, or the corrosion of the first metallized layer 12a causes an electrical conductivity of the first metallized layer 12a to be damaged, and furthermore, the first metallized layer 12a to be disconnected.

SUMMARY OF THE INVENTION

Hence, the invention has been made in consideration of the problems and its object is to provide a ceramic container which does not generate a drawback that a component of a first metallized layer of the ceramic container is eluted into an electrolyte due to corrosion of the metallized layer caused by the electrolyte, resulting in a damage of the performance of a battery or electric double layer capacitor using the ceramic container, a great deterioration in an electrical conductivity of the first metallized layer due to the corrosion and disconnection, and provide an battery and electric double layer capacitor having a high performance using the ceramic container.

The invention provides a ceramic container comprising:

a ceramic base having a hollow or open portion for accommodating a battery element or an electric double layer capacitor element, defined by a bottom portion and a side wall which surrounds a bottom face of the bottom portion, the bottom face facing the hollow or open portion;

a ceramic coating layer formed on a periphery of the bottom face along an inner face of the side wall;

a metallized layer extending, on the bottom face, from a portion provided under the side wall to an inside of an inner end of the ceramic coating layer via a portion provided under the ceramic coating layer; and a conductive layer formed on the bottom face in order to cover an extended portion of the metallized layer and the ceramic coating layer.

According to the invention, the ceramic container comprises a ceramic base having a hollow or open portion for accommodating a battery element or an electric double layer capacitor element, defined by a bottom portion and a side wall which surrounds a bottom face of the bottom portion which bottom face faces the hollow or open portion; a ceramic coating layer formed on a periphery of the bottom face along an inner face of the side wall; a metallized layer extending, on the bottom face, from a portion provided under the side wall to an inside of an inner end of the ceramic coating layer via a portion provided under the ceramic coating layer; and a conductive layer formed on the bottom face in order to cover an extended portion of the metallized layer and the ceramic coating layer. Therefore, the metallized layer does not come in contact with the electrolyte and it is possible to prevent the component of the metallized layer from being eluted into a electrolyte to deteriorate the electrolyte, the metallized layer from being corroded by the electrolyte to degrade an electrical conductivity of the metallized layer, and the metallized layer from being disconnected.

Furthermore, it is also possible to obtain functions and advantages that it is possible to prevent the delamination of the bonding portion of the bottom portion of the ceramic base and the side wall by the ceramic coating layer, and furthermore, it is possible to reliably bond the surface of the metallized layer and the lower surface of the side wall by covering the metallized layer between the bottom portion of the ceramic base and the sidewall with the ceramic coating.

In the invention, it is preferable that the ceramic coating layer is formed over a whole periphery of the extended portion from an outer peripheral portion of an upper surface of the extended portion to the bottom face of the bottom portion in addition to the ceramic coating layer provided immediately under the side wall.

According to the invention, the ceramic coating layer should be formed over a whole periphery of the extended portion from an outer peripheral portion of an upper surface of the extended portion to the bottom face of the bottom portion in addition to the ceramic coating layer provided immediately under the side wall in the structure. Therefore, the metallized layer is formed on the bottom face facing the hollow or open portion so that a step generated on the outer peripheral surface of the extended portion of the metallized layer can be filled with the ceramic coating layer. Consequently, a defective formation portion in which a continuous film surface is not formed on the conductive layer from the surface of the extended portion to the bottom face facing the hollow or open portion in the conductive layer can be prevented from being generated in the vicinity of the lower end of the step. As a result, it is possible to prevent the component of the metallized layer from being eluted into the electrolyte by the contact of the outer peripheral surface of the extended portion with the electrolyte, causing a deterioration in the electrolyte, and the metallized layer from being corroded by the electrolyte, causing a degradation in the electrical conductivity of the metallized layer.

In the invention, it is preferable that the ceramic coating layer is formed of sintered alumina and has a thickness of 3 µm or more.

According to the invention, moreover, the ceramic coating layer should be formed of sintered alumina and should have a thickness of 3 µm or more. Therefore, the ceramic coating layer in which the metallized layer is hard to be corroded by the electrolyte functions as a protective layer so that the corrosion and elution of the metallized layer can be prevented effectively.

In the invention, it is preferable that the ceramic coating layer is composed of a plurality of layers.

According to the invention, furthermore, the ceramic coating layer should be composed of a plurality of layers. Therefore, it is possible to form the ceramic coating layer to be a protective layer having a high reliability which is further hard to be corroded by the electrolyte. Thus, it is possible to effectively prevent the corrosion and elution of the metallized layer.

In the invention, it is preferable that the conductive layer is formed of at least one metal selected from aluminum, zinc or an alloy containing these metals as main components, gold, stainless steel and titanium.

According to the invention, moreover, the conductive layer should be formed of at least one metal selected from aluminum, zinc or an alloy containing these metals as main components, gold, stainless steel and titanium in the structure. Therefore, the metallized layer provided on the bottom face facing the hollow or open portion is covered with the conductive layer and the ceramic coating layer which have a corrosion resistance and is thus protected from the electrolyte. Accordingly, the metallized layer can be prevented from being corroded and the component thereof can be hindered from being eluted into the electrolyte.

Furthermore, the conductive layer is formed of a metal which is hard to be corroded by the electrolyte. Therefore, it is possible to prevent the corrosion and elution of the metallized layer. Thus, the reliability of the ceramic container can be enhanced.

In the invention, it is preferable that the conductive layer is composed of an aluminum layer and a titanium layer laminated on the aluminum layer.

Furthermore, in the invention, it is preferable that the conductive layer is composed of a titanium layer and an aluminum layer laminated on the titanium layer.

Furthermore, in the invention, it is preferable that the conductive layer is composed of layers obtained by sequentially laminating an aluminum layer and a titanium layer on another titanium layer.

According to the invention, furthermore, the conductive layer should be composed of any of layers obtained by laminating a titanium layer on an aluminum layer, layers obtained by laminating an aluminum layer on the titanium layer, and layers obtained by sequentially laminating an aluminum layer and a titanium layer on another titanium layer. Therefore, the metals which are hard to be corroded by the electrolyte are formed like a layer so that the conductive layer which is very hard to be corroded is formed. More specifically, in the case in which the aluminum layer is corroded by the electrolyte, the corrosion progresses granularly. On the other hand, in the case in which the titanium layer is corroded by the electrolyte, the corrosion progresses like a column. Even if the conductive layer is corroded, therefore, the way of the progress of the corrosion is different between the aluminum layer and the titanium layer. Therefore, it is possible to make the progress of corrosion up to the metallized layer difficult. Accordingly, it is possible to effectively prevent the corrosion and elution of the metallized layer. Thus, the liability of the ceramic container can be enhanced very greatly.

The invention provides a battery comprising:

the ceramic container mentioned above;

a positive electrode;

a negative electrode;

a separator provided between the positive and negative electrodes;

an electrolyte; and a lid attached to an upper surface of the side wall in order to close the hollow or open portion, the positive electrode, the negative electrode, the separator and the electrolyte being accommodated in the hollow or open portion.

According to the invention, the battery comprises the ceramic container mentioned above, a positive electrode, a negative electrode, a separator provided between the positive and negative electrodes, an electrolyte, and a lid attached to an upper surface of the side wall in order to close the hollow or open portion. The positive electrode, the negative electrode, the separator and the electrolyte are accommodated in the hollow or open-portion. Therefore, it is possible to obtain a battery in which a property is hard to deteriorate and an airtight reliability is enhanced.

The invention provides an electric double layer capacitor comprising:

the ceramic container mentioned above;

two polarizable electrodes;

a separator provided between the two polarizable electrodes;

an electrolyte; and a lid attached to an upper surface of the side wall in order to close the hollow or open portion, the two polarizable electrodes, separator and electrolyte being accommodated in the hollow or open portion.

According to the invention, the electric double layer capacitor Comprises the ceramic container, two polarizable electrodes, a separator provided between the two polarizable electrodes, an electrolyte, and a lid attached to an upper surface of the side wall in order to close the hollow or open portion. The two polarizable electrodes, the separator and the electrolyte are accommodated in the hollow or open portion. Therefore, it is possible to obtain an electric double layer capacitor in which a property is hard to deteriorate and an airtight reliability is enhanced.

BRIEF DESCRIPTION OF THE DRAWINGS

Other and further objects, features, and advantages of the invention will be more explicit from the following detailed description taken with reference to the drawings wherein:

FIGS. 6A and 6B are partial enlarged sectional views schematically showing the surroundings of a metal plated layer in FIG. 4, wherein FIG. 6A shows the case in which a thickness of a ceramic coating layer is greater than that of the metal plated layer, and FIG. 6B shows the case in which the thickness of the ceramic coating layer is greater than that of the metal plated layer;

DETAILED DESCRIPTION

Figure 1A:
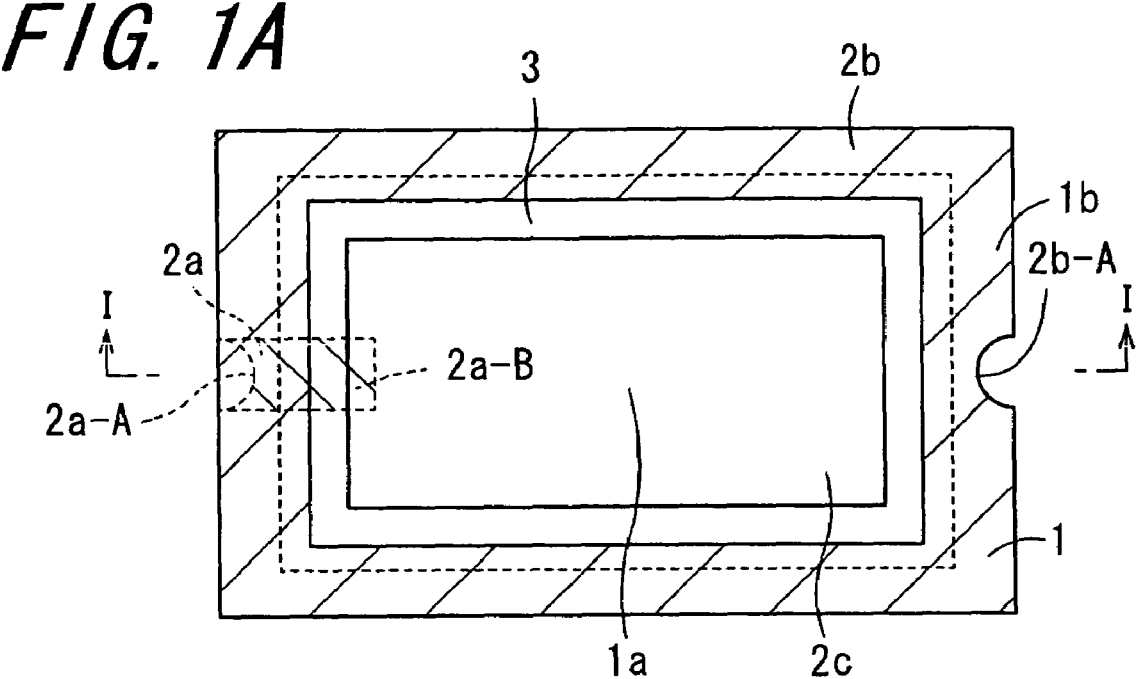
FIG. 1A is a plan view showing a ceramic container according to one embodiment of the invention.

Now referring to the drawings, preferred embodiments of the invention are described below.

A ceramic container and a battery or an electric double layer capacitor using the ceramic container according to the invention will be described below in detail.

Figure 1B:
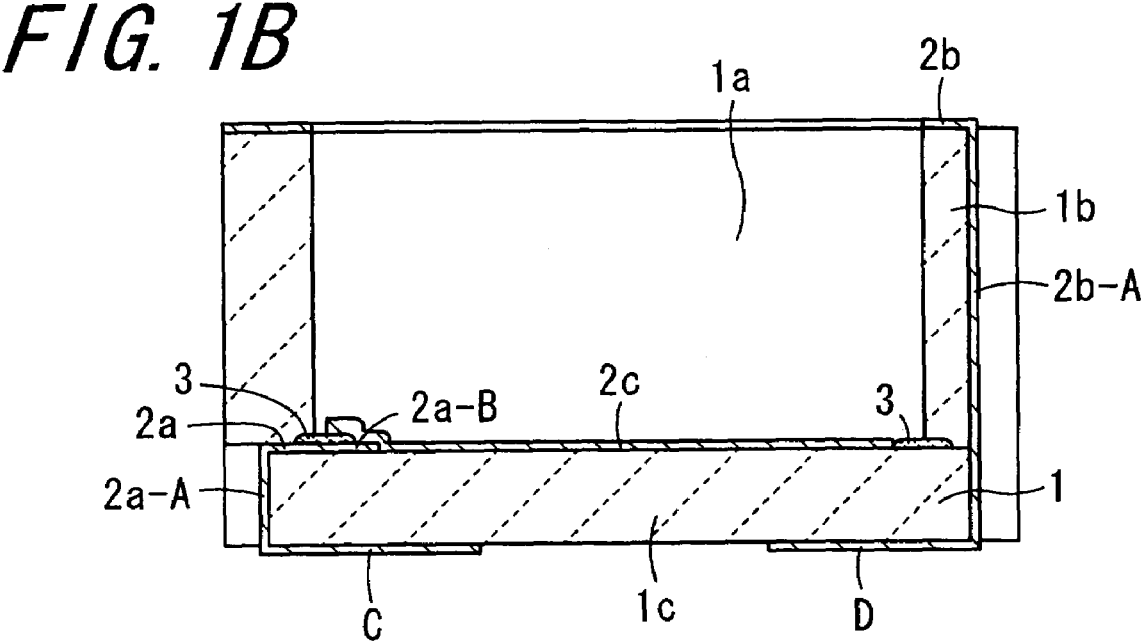
FIG. 1B is a sectional view of FIG. 1A.
Figure 2:
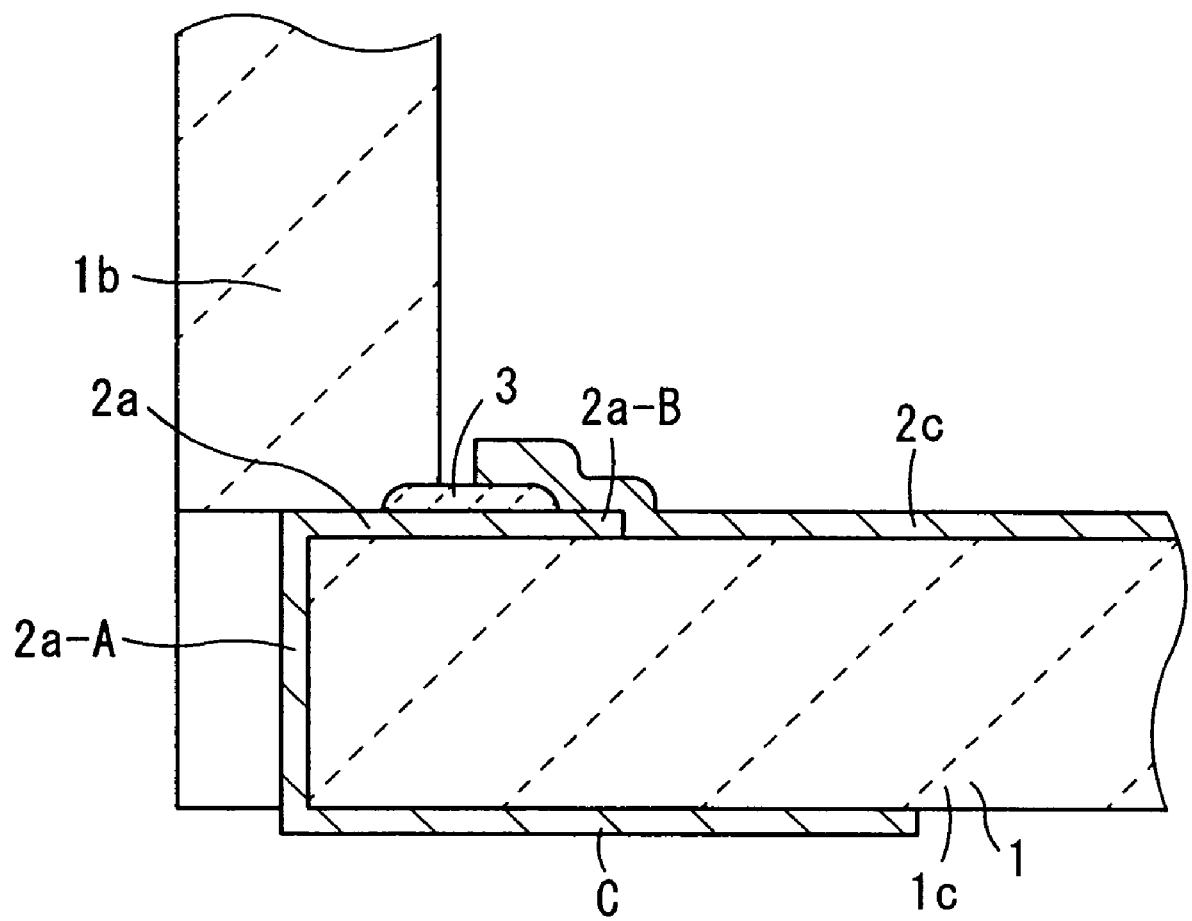
FIG. 2 is an enlarged sectional view showing a main part in FIG. 1B.
Figure 3A:
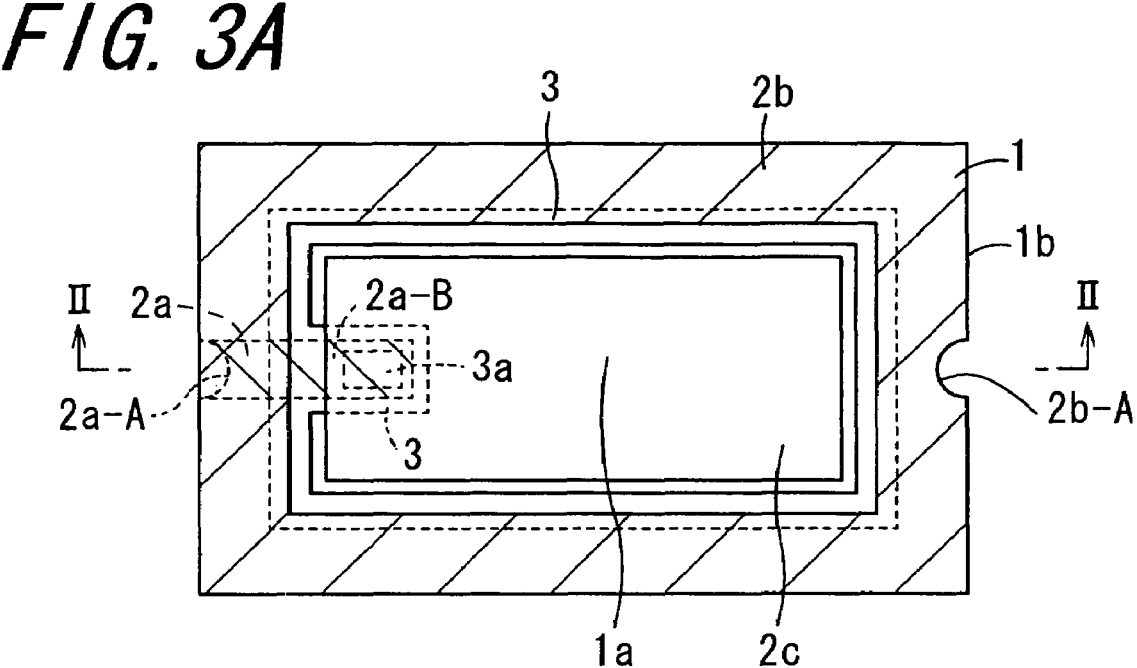
FIG. 3A is a plan view showing the ceramic container according to another embodiment of the invention.
Figure 3B:
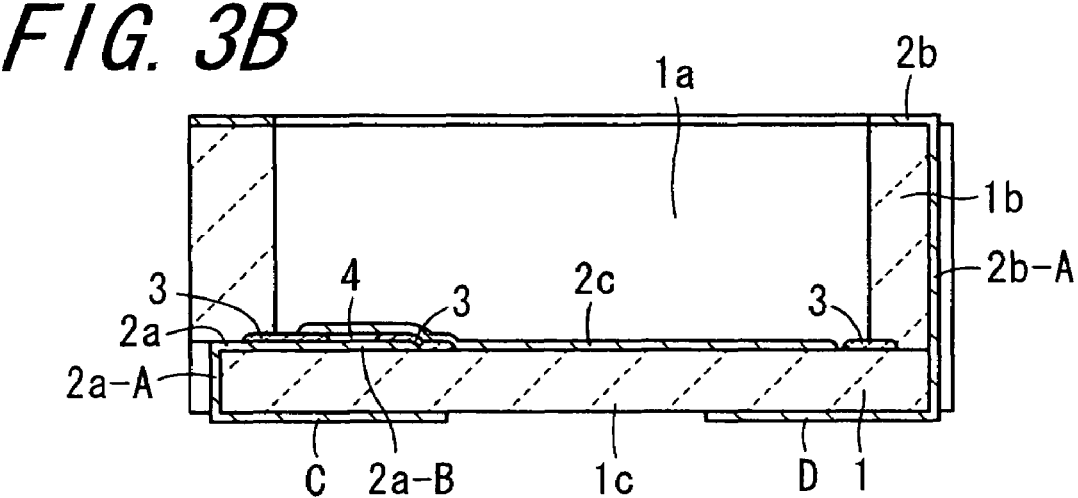
FIG. 3B is a sectional view of FIG. 3A.
Figure 4:
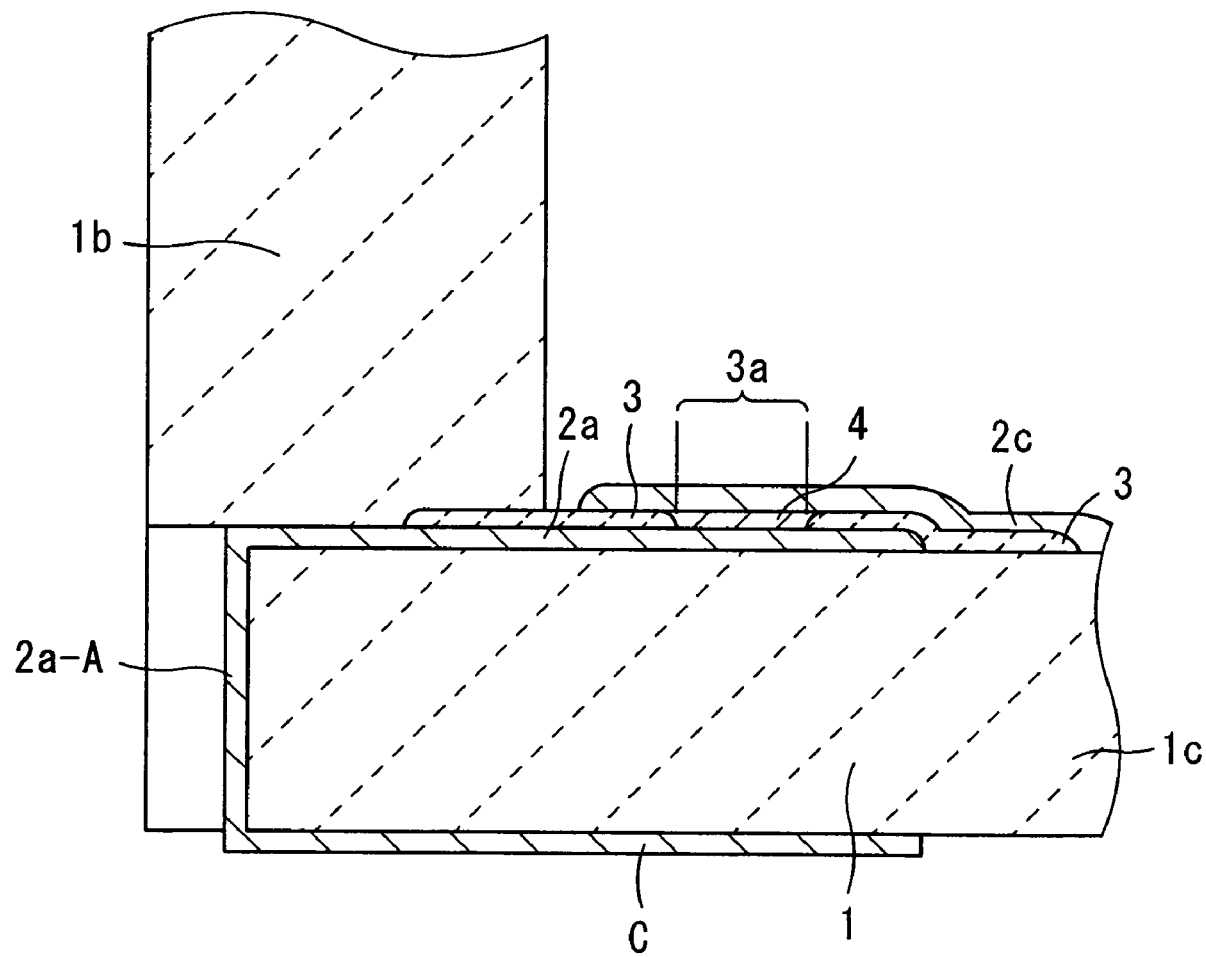
FIG. 4 is an enlarged sectional view showing a main part in FIG. 3B.

FIG. 1A is a plan view showing one embodiment of a ceramic container according to the invention, and FIG. 1B is a sectional view taken on line I-I of FIG. 1A. Moreover, FIG. 2 is an enlarged sectional view showing a main part (a left and lower portion) in FIG. 1B. Furthermore, FIG. 3A is a plan view showing the ceramic container according to another embodiment of the invention and FIG. 3B is a sectional view taken on line II-II of FIG. 3A. In addition, FIG. 4 is an enlarged sectional view showing a main part (a left and lower portion) in FIG. 3B.

Referring to these drawings, the ceramic container includes a ceramic base 1, a metallized layer 2a, a ceramic coating layer 3 and a conductive layer 2c. The ceramic base 1 has a hollow or open portion 1a defiend by a side wall 1b and a bottom portion 1c in which hollow or open portion a battery element or an electric double layer capacitor element is accommodated. The side wall 1b surrounds the bottom face of the bottom portion 1c facing the hollow or open portion 1a and faces the hollow or open portion 1a. Namely, the ceramic base 1 includes the bottom portion 1c having a surface including the bottom face facing the hollow or open portion 1a, and the frame-shaped side wall 1b standing on an outer periphery of the bottom portion 1c. The surface of the bottom portion 1c surrounded by the side wall 1b is a bottom face facing the hollow or open portion 1a. A metallized layer (hereinafter referred to as a first metallized layer) 2a is formed on the bottom face facing the hollow or open portion 1a of the ceramic base 1. In the bottom portion 1c, a connecting conductor (hereinafter referred to as a first connecting conductor) 2a-A is formed from the first metallized layer 2a to an outside of the ceramic base 1. The metallized layer 2a has an extended portion 2a-B which extends toward an inside from a position provided immediately under an inner side wall surface of the side wall 1b. The ceramic coating layer 3 is formed along an outer edge of the bottom face from a lower end of the side wall 1b to the bottom face and formed on the whole periphery of the extended portion 2a-B from an outer peripheral portion of the upper surface of the extended portion 2a-B of the first metallized layer 2a to the bottom face, thereby surrounding the extended portion 2a-B.

Figure 5:
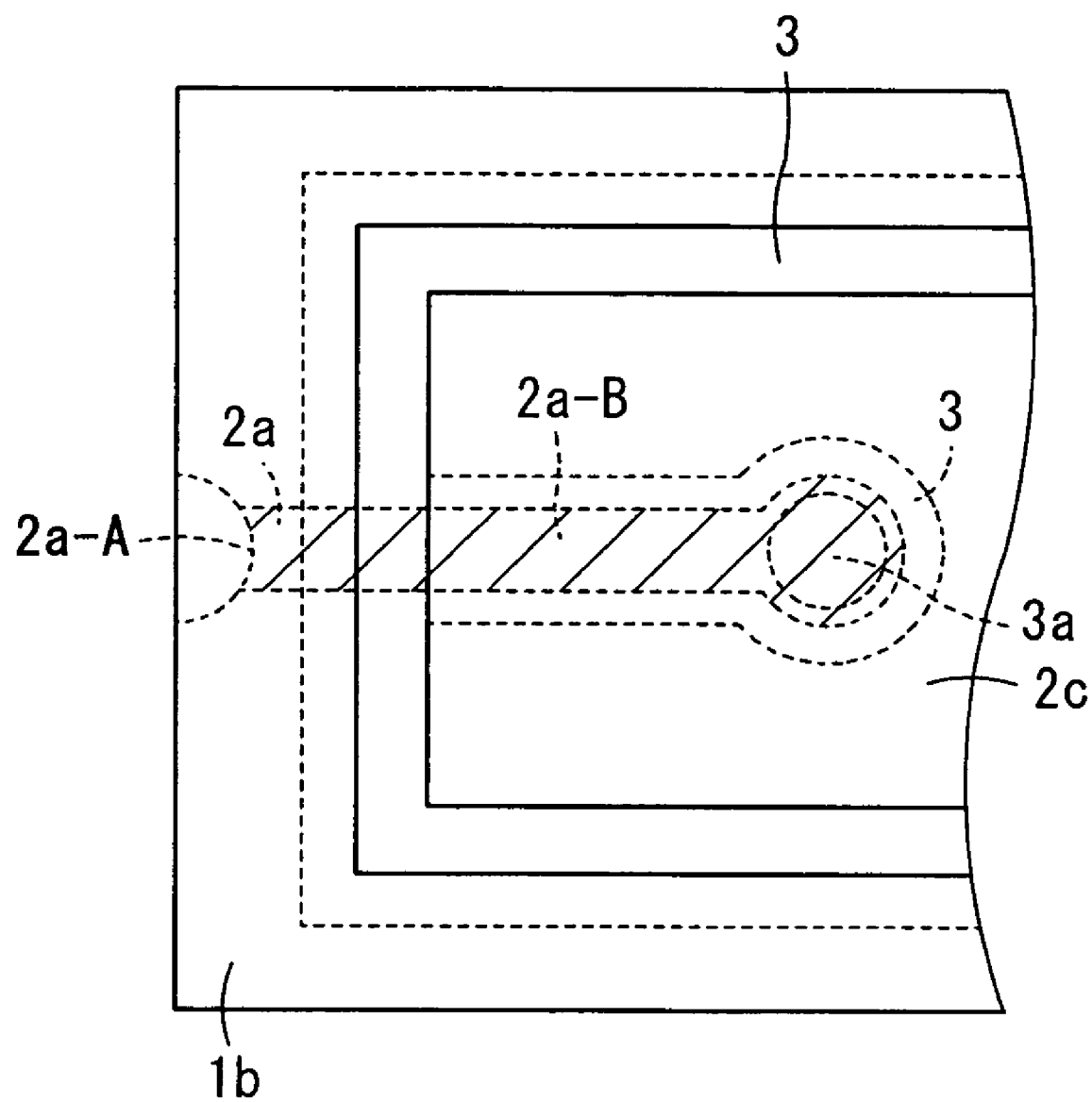
FIG. 5 is an enlarged plan view showing a main part of the ceramic container according to yet another embodiment of the invention.

In the embodiment of the invention, a first electrode C is formed on a lower surface of the ceramic base 1, and the first electrode C is connected to the first metallized layer 2a by forming the first connecting conductor 2a-A from the first metallized layer 2a to the first electrode C. Moreover, a second electrode D is formed on the lower surface of the ceramic base 1 electrically independently of the first electrode C. A second metallized layer 2b is formed on the upper surface of the side wall 1b to surround the hollow or open portion 1a. On the side wall 1b, a second connecting conductor 2b-A is formed from the second metallized layer 2b to the second electrode D. In FIGS. 1A, 3A and 5, portions in which the first metallized layer 2a and the second metallized layer 2b are formed are shown in hatching for easy understanding and these are not cross sections.

Figure 6A:
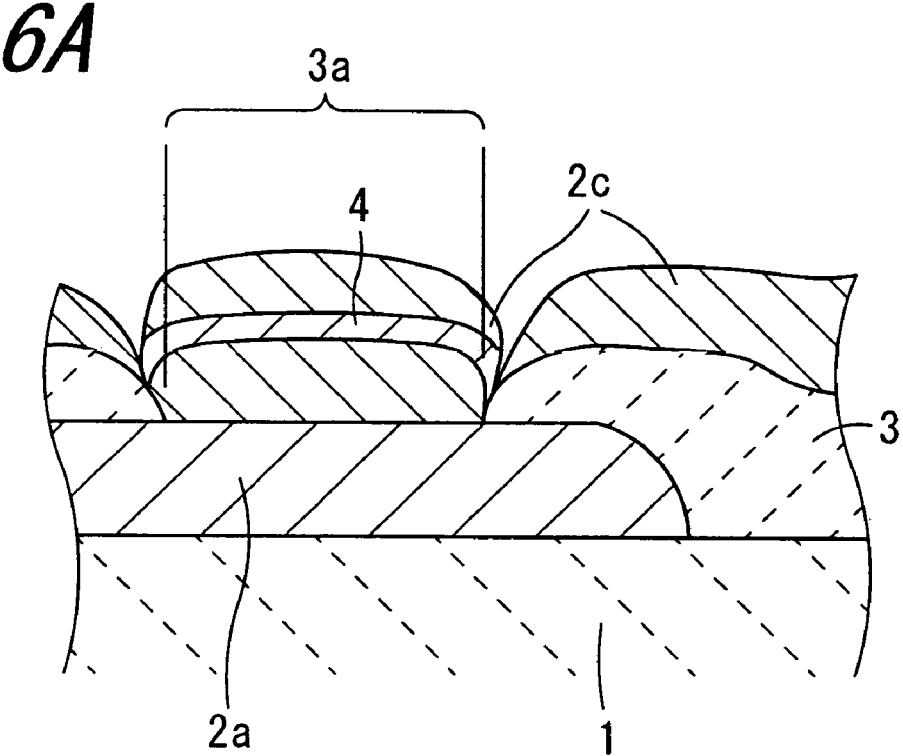
Figure 6B:
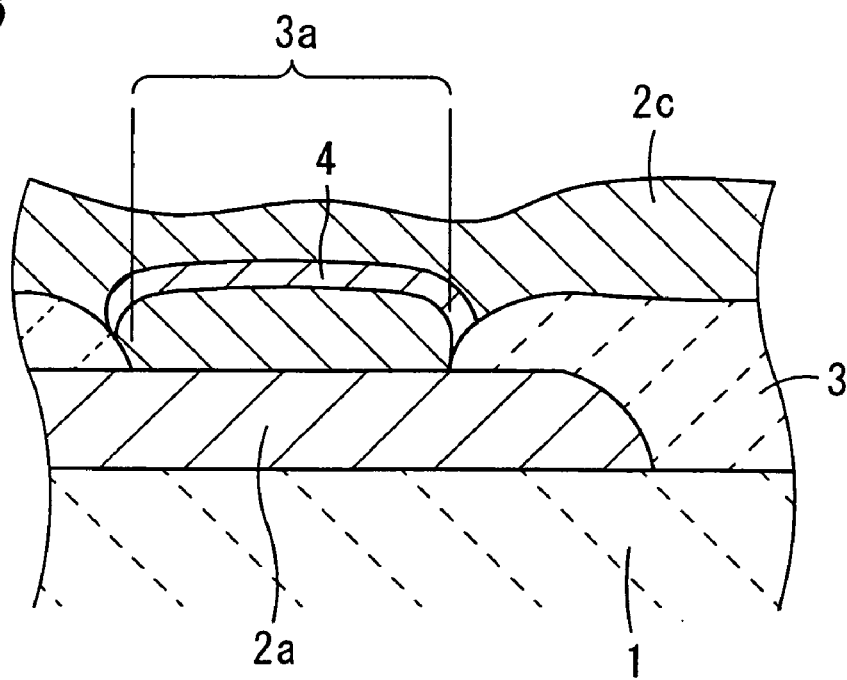
Figure 7:
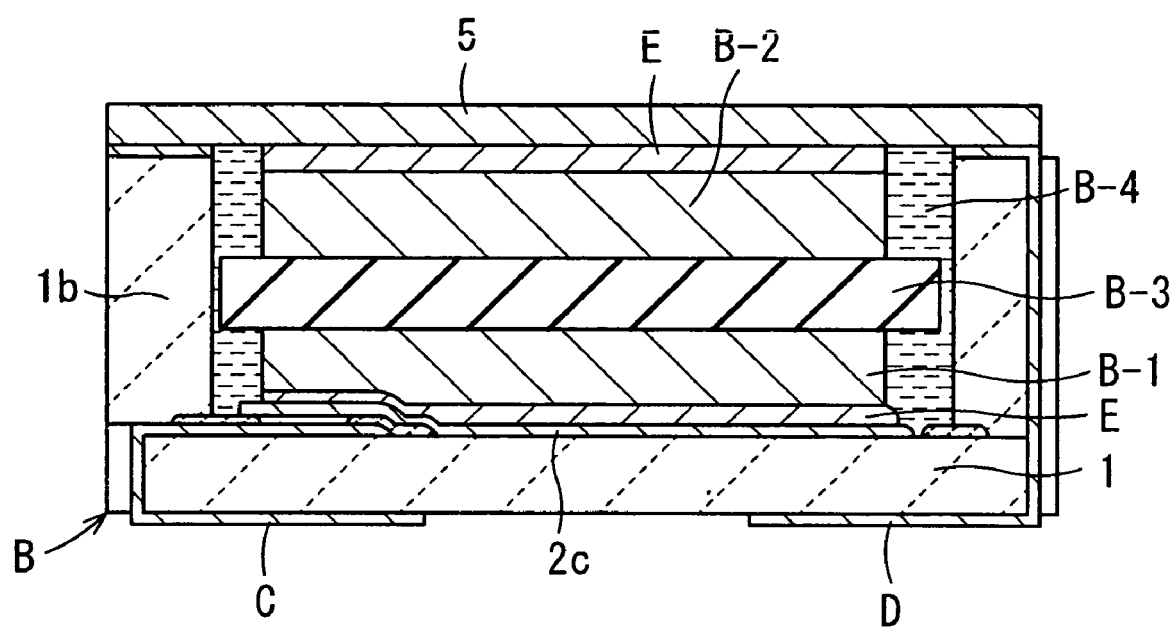
FIG. 7 is a sectional view showing a battery or an electric double layer capacitor according to yet another embodiment of the invention.
Figure 8:
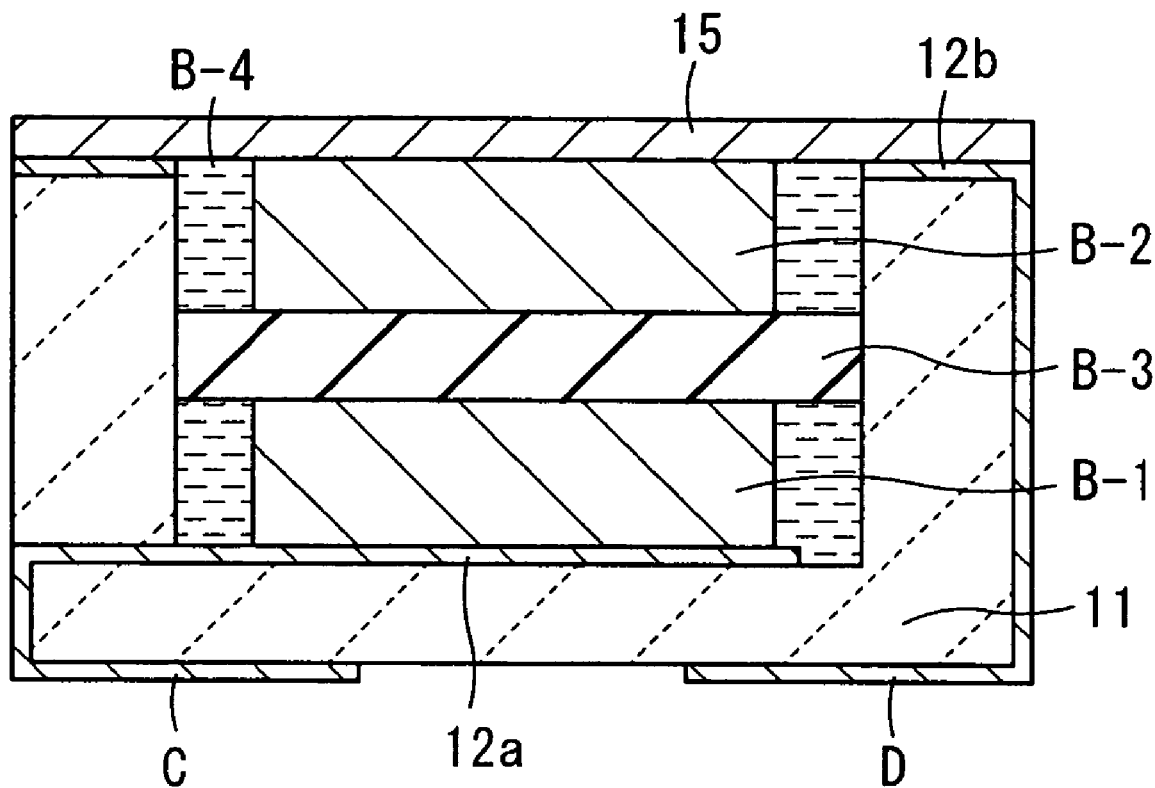
FIG. 8 is a sectional view showing an example of a related art battery and electric double layer capacitor.

Moreover, FIG. 7 is a sectional view showing a battery B or an electric double layer capacitor B according to yet another embodiment of the invention. In FIG. 7, reference symbol B-1 denotes a positive electrode or a polarizable electrode (a first polarizable electrode), reference symbol B-2 denotes a negative electrode or a polarizable electrode (a second polarizable electrode), reference symbol B-3 denotes a separator provided between the positive electrode (or the first polarizable electrode) B-1 and the negative electrode (or the second polarizable electrode) B-2, and reference symbol B-4 denotes an electrolyte. The battery element or the electric double layer capacitor element constituted by the positive electrode (the first polarizable electrode) B-1, the negative electrode (the second polarizable electrode) B-2, the separator B-3 and the electrolyte B-4 is accommodated in the hollow or open portion 1a. Moreover, reference numeral 5 denotes a lid attached to the upper surface of a side wall 1b to cover and close a hollow or open portion 1a. Common portions to those FIGS. 1A, 1B, 2, 3A, 3B, 4, 5 6A and 6B have the same reference numerals.

In the ceramic container according to the invention, the ceramic base 1 takes a shape of a rectangular parallelepiped, a cylinder or a polygonal prism which is formed of ceramics such as sintered alumina (aluminum oxide, $Al_2O_3$) and is fabricated in the following manner. For example, in the case in which the ceramic base 1 is made of sintered $Al_2O_3$, a proper organic binder or solvent is added and mixed into raw material powder such as $Al_2O_3$, silicon oxide ($SiO_2$), magnesium oxide (MgO) or calcium oxide (CaO) so that a slurry is formed. Green sheets are formed from the slurry by a doctor blade method or a calendar roll method and are cut to have a predetermined size. Next, a plurality of green sheets selected from among them are subjected to suitable blanking for forming the hollow or open portion 1a taking the shape of a rectangular parallelepiped, a cylinder or a polygonal prism.

Then, a metal paste containing metal powder such as tungsten (W) as a main component is printed and applied to predetermined positions of these green sheets to form metal paste layers to be the first and second metallized layers 2a and 2b, the first and second connecting conductors 2a-A and 2b-A, and the first and second electrodes C and D, and subsequently, the green sheets having the metal paste layers formed thereon are laminated and are fired at a temperature of approximately 1600° C. so that the ceramic base 1 is fabricated.

In FIGS. 1A, 1B, 2, 3A, 3B and 4, the first metallized layer 2a is formed so as to be led from the extended portion 2a-B formed on an inside of an inner end of the ceramic coating layer 3 provided on the lower end of the side wall 1b to a portion provided under the side wall 1b via a portion provided under the ceramic coating layer 3. Moreover, there are shown the case in which both of the first and second connecting conductors 2a-A and 2b-A are so-called castellation conductors which are formed on an internal surface of a groove provided on the side surface of the ceramic base 1 and the case in which the first connecting conductor 2a-A in which the first metallized layer 2a is connected to the first electrode C on an outside surface from the first metallized layer 2a led to an outside placed under the side wall 1b or the second connecting conductor 2b-A for connecting the second metallized layer 2b to the second electrode D is implemented by the castellation conductor.

The first and second connecting conductors 2a-A and 2b-A may be simple side conductors in place of the castellation conductors. In the case of the castellation conductor, however, a conductor layer can be formed by a suction printing method after a castellation is formed. Consequently, it is possible to obtain operations and effects that a productivity can be enhanced more greatly as compared with the case in which the side surface of the ceramic base 1 is subjected to screen printing to form the side conductor.

Moreover, the first and second connecting conductors 2a-A and 2b-A may be via-hole conductors which vertically penetrate through the inner part of the ceramic base 1. In this case, the first metallized layer 2a is connected to the first electrode C through a via-hole conductor (not shown) which penetrates through the bottom portion 1c of the ceramic base 1 from the first metallized layer 2a in a vertical direction, that is, a thickness direction thereof. Similarly, the second metallized layer 2b is connected to the second electrode D through a via hole conductor (not shown) which penetrates through the side wall 1b of the ceramic base 1 from the second metallized layer 2b in the vertical direction, that is, a direction of height thereof.

In the case of the first and second connecting conductors 2a-A and 2b-A which are connected through the via-hole conductor, the first metallized layer 2a and the first electrode C, and the second metallized layer 2b and the second electrode are connected at the shortest distance, respectively. Consequently, an internal resistance can be reduced. Accordingly, it is also possible to suppress the generation of heat.

In the case in which the first connecting conductors 2a-A is constituted by the via-hole conductor, the first metallized layer 2a does not need to be always formed close to the side wall 1b. For example, the first metallized layer 2a may be formed in a central part of the bottom face facing the hollow or open portion 1a, may be led from the lower surface of the first metallized layer 2a through the first connecting conductor 2a-A constituted by the via-hole conductor, and may be connected to the first electrode C provided on the lower surface of the ceramic base 1. In this case, the ceramic coating layer 3 for covering the outer peripheral portion of the first metallized layer 2a is formed from the outer peripheral portion of the upper surface of the first metallized layer 2a to the bottom face facing the hollow or open portion 1a in order to surround the first metallized layer 2a independently of the ceramic coating layer 3 provided on the lower end of the side wall 1. The first connecting conductor 2a-A is formed with an upper surface covered with the first metallized layer 2a. Therefore, the first connecting conductor 2a-A can be prevented from being exposed to the electrolyte B-4.

While the first connecting conductor 2a-A is formed to have a width which is equal to a width of the first metallized layer 2a and is provided rectilinearly toward the lower surface of the ceramic base 1 in FIGS. 1A and 3A, moreover, the first connecting conductor 2*a*-A may be formed as a conductor having a smaller width than the width of the first metallized layer 2*a*. Consequently, a delamination of the ceramic base 1 is hard to occur.

It is preferable that a printing thickness of the metal paste should be regulated in order for the first metallized layer 2*a* and the second metallized layer 2*b* to have thicknesses of 5 to 15 µm after firing. It is sufficient that a dry thickness is set to be 7 to 20 µm. In the case in which the thickness obtained after the firing is smaller than 5 µm, a glassy film is easily generated on the surface. In some cases, therefore, there is generated a drawback that the adhesiveness of the conductive layer to be coated is apt to be damaged and the conductive layer is thus peeled. In some cases in which the thickness is greater than 15 µm, moreover, a warpage of the ceramic base 1 is caused due to the fact that a firing speed of the green sheet to be the ceramic coating layer 3 and the ceramic base 1 is usually different from that of the metal paste layer.

While FIGS. 1A and 3A show an example in which the first metallized layer 2*a* and the second metallized layer 2*b* are connected to the first and second connecting conductors 2*a*-A and 2*b*-A, and furthermore, are formed to extend to the lower surface of the ceramic base 1, moreover, the first connecting conductor 2*a*-A and the second metallized layer 2*b* may extend to the side surface of the ceramic base 1 to stay at the outside surface of the side wall 1*b*. In that case, a finished battery or electric double layer capacitor is connected to an external electric circuit (not shown) by a connection to the first connecting conductor 2*a*-A and the second metallized layer 2*b* which are led to the outside surface of the side wall 1*b*.

On the other hand, in the case in which the first connecting conductor 2*a*-A and the second connecting conductor 2*b*-A are formed so as to extend to the lower surface of the ceramic base 1 and to be connected to the first electrode C and the second electrode D respectively, the ceramic container is mounted on an upper surface of a plate-shaped external electric circuit board. Consequently, there is an advantage that the first and second electrodes C and D can easily be connected to an external electric circuit by soldering through a surface mounting method.

In the case in which the first metallized layer 2*a* and the second metallized layer 2*b* are formed to extend to the outside surface of the ceramic base 1 but are not led to the bottom face of the ceramic base 1 through the first and second connecting conductors 2*a*-A and 2*b*-A, furthermore, a protruded portion is provided on a wiring conductor of the external electric circuit board and is connected to abut on the first connecting conductor 2*a*-A and the second connecting conductor 2*b*-B. Consequently, there is an advantage that a connection to the external electric circuit board can be carried out easily and reliably and an alignment can be thus performed readily.

It is preferable to sequentially provide a metal having a high corrosion resistance and an excellent wettability to a solder, more specifically, an Ni layer having a thickness of 1 to 12 µm and a gold (Au) layer having a thickness of 0.05 to 5 µm, by a plating method, on the exposed surfaces of the conductor layers such as the first metallized layer 2*a*, the second metallized layer 2*b*, the first connecting conductor 2*a*-A, the second connecting conductor 2*b*-A, the first electrode C and the second electrode D which are formed on the ceramic base 1 thus fabricated. In particular, therefore, it is possible to effectively prevent the first metallized layer 2*a* exposed to the inner part of the ceramic container from being easily eluted at a voltage applied by charging and discharging, and furthermore, to strongly provide the conductive layer 2*c* when forming the conductive layer 2*c* on the extended portion 2*a*-B of the second metallized layer 2*b*. Moreover, it is possible to effectively prevent an oxidation from being carried out in an exposure to an external atmosphere such as the air after forming the extended portion 2*a*-B. In each conductor layer exposed to the outside, moreover, a wettability to a solder can be enhanced and a bonding strength to the wiring conductor on the external electric circuit board is increased more greatly, and an oxidation and corrosion such as a rust can be prevented.

In the case in which the thickness of the Ni layer is smaller than 1 µm, it is hard to prevent the oxidation and corrosion of each of the conductor layers and to effectively hinder a metal component from being eluted from each of the conductor layers. Consequently, the performance of the battery is apt to be deteriorated. In the case in which the thickness of the Ni layer is greater than 12 µm, moreover, a very long time is required for plating so that a mass production is reduced easily.

In the case in which the thickness of the Au layer is smaller than 0.05 µm, moreover, it is hard to form an Au layer having a uniform thickness. Consequently, a portion having a very thin Au layer or a port on which the Au layer is not formed is generated easily so that the effect of preventing the oxidation and corrosion and the wettability to the solder are reduced readily. In the case in which the thickness of the Au layer is greater than 5 µm, furthermore, a very long time is required for the plating so that the mass production is reduced easily.

It is preferable that a brazing material should be previously welded to the surface of the second metallized layer 2*b*, which is not shown. By this structure, the welded brazing material is fused when the lid 5 is melted and bonded, and the second metallized layer 2*b* and the lid 5 are blazed, and furthermore, the melted brazing material is spread along a portion between the lid 5 and the second metallized layer 2*b* so that a gap formed between the lid 5 and the upper surface of the side wall 1*b* is filled with the thickness of the second metallized layer 2*b* or the warp of the upper surface of the side wall 1*b*. Consequently, the electrolyte B-4 is hard to enter the gap, and furthermore, the lid 5 and the second metallized layer 2*b* are bonded more strongly. Consequently, it is also possible to enhance the reliability of the bond of the lid 5 and the ceramic base 1.

It is more preferable that the brazing material should be an Al brazing material. Consequently, there is an advantage that the brazing material is hard to corrode with respect to the electrolyte B-4 filled in the hollow or open portion 1*a*. As a result, it is possible to obtain a battery B or an electric double layer capacitor B which is very excellent in an airtight reliability.

Furthermore, a metallic frame-shaped member formed of an Fe—Ni—Co alloy or Al may be brazed to the second metallized layer 2*b* through a brazing material such as a silver (Ag) brazing material or an Al brazing material in order to surround the hollow or open portion 1*a* over the upper surface of the side wall 1*b* of the ceramic base 1, which is not shown.

Next, the ceramic coating layer 3 is formed by applying a ceramic paste to a portion to be an inner lower end of the side wall 1*b* before laminating green sheets to be the side wall 1*b* when the green sheets to be the ceramic base 1 is to be laminated. The ceramic paste to be the ceramic coating layer 3 is fabricated as a paste having a viscosity of several thousands of poises by adding a sintering assistant such as SiO$_2$, MgO or CaO in a proper amount to Al$_2$O$_3$ powder having an average particle size of approximately 1 to 3 μm and adding additives, for example, a binder formed of an acrylic resin, a plasticizer such as dibutyl phthalate and a dispersing agent together with an organic solvent such as toluene and kneading them by means of a ball mill.

The ceramic coating layer 3 is formed on the inner lower end of the side wall 1b. Consequently, the green sheets are bonded to each other through a ceramic paste to become the ceramic coating layer 3 which is comparatively softer than the green sheet so that a delamination of the bonding portion can be prevented. In addition, the first metallized layer 2a between the bottom portion of the ceramic base 1 and the side wall 1b is covered so that the surface of the first metallized layer 2a and the lower surface of the side wall 1b can be reliably bonded to each other.

Moreover, it is more preferable that the ceramic coating layer 3 should have a glassy layer formed on an interface with the first metallized layer 2a. The glassy layer is generated by a reaction of a sintering assistant such as SiO$_2$, MgO or CaO to Al$_2$O$_3$. Because Al$_2$O$_3$ is contained as a component of glass, a glassy layer is hard to be corroded by the electrolyte B-4.

In another embodiment of the invention shown in FIGS. 3A and 3B, moreover, it is preferable that the ceramic paste should be applied to the portion placed immediately under the side wall 1b, and furthermore, the ceramic paste to be the ceramic coating layer 3 should also be applied to a whole circumference from the outer peripheral portion of the upper surface of the extended portion 2a-B of the first metallized layer 2a to the bottom face facing the hollow or open portion 1a. In this case, on the ceramic coating layer-3 is formed an opening 3a which serves as a non-forming portion of the ceramic coating layer 3, at a position facing a central part of the extended portion 2a-B of the first metallized layer 2a. The first metallized layer 2a and the conductive layer 2c are electrically connected to each other through the opening 3a.

By this structure, the first metallized layer 2a is formed on the bottom face facing the hollow or open portion 1a so that an inclined face of a step generated on the outer peripheral surface of the extended portion 2a-B of the first metallized layer 2a can be gentle in order to fill the step with the ceramic coating layer 3. Thus, it is possible to prevent the case in which the conductive layer 2c is not formed as a continuous film surface from the surface of the first metallized layer 2a to the bottom face facing the hollow or open portion 1a so that a defective forming portion is generated on the conductive layer 2c in the vicinity of a lower end of the step. As a result, it is possible to prevent the component of the first metallized layer 2a from being eluted into the electrolyte B-4 in contact of the outer peripheral surface of the first metallized-layer 2a with the electrolyte B-4, resulting in a deterioration in the electrolyte B-4 and to prevent the first metallized layer 2a from being corroded by the electrolyte B-4, resulting in a damage in the electrical conductivity of the first metallized layer 2a.

According to the structure, moreover, the outer peripheral portion of the first metallized layer 2a is covered with the ceramic coating layer 3. Therefore, the first metallized layer 2a is hard to peel from the ceramic base 1. Consequently, it is possible to suppress the generation of a hindrance to an electrical bond of the first metallized layer 2a in a non-forming portion 3a of the ceramic coating layer 3 which is not covered with the ceramic coating layer 3 in a central part of the extended portion 2a-B and the conductive layer 2c.

Moreover, it is preferable that only a tip part of the extended portion 2a-B of the first metallized layer 2a should be formed to have a great width and the ceramic coating layer 3 should be formed to cover an outer peripheral portion of the tip part of the extended portion 2a-B and a whole surface of a residual part excluding the tip part as shown in FIG. 5. By the structure, a connecting area to the positive electrode or (first) polarizable electrode B-1 can be maintained and an electrical connection can be carried out reliably in the tip part of the extended portion 2a-B in which the first metallized layer 2a and the positive electrode or (first) polarizable electrode B-1 are electrically connected to each other, and furthermore, the residual part is set to have a small width and is covered with the ceramic coating layer 3 so that a possibility that the first metallized layer 2a might be damaged by the electrolyte B-4 can be reduced as greatly as possible. The tip part of the extended portion 2a-B can have various shapes seen on a plane, for example, a square or a circle as shown in FIG. 5.

In the case in which a metal plated layer 4 composed of an Ni layer and an Au layer is provided in the extended portion 2a-B, moreover, it is desirable that the thickness of the metal plated layer 4 should be at least approximately 3 μm in order to effectively prevent the oxidation of the extended portion 2a-B. In this case, the thickness of the ceramic coating layer 3 on the first metallized layer 2a is set to be greater than that of the metal plated layer 4 provided thereon, which is implemented by regulating the viscosity of the ceramic paste.

The ceramic coating layer 3 for covering the outer peripheral portion of the first metallized layer 2a is set to be thicker than the metal plated layer 4 for the following reason. The metal plated layer 4 formed to cover the non-forming portion 3a generally has a side portion taking a swollen shape in a transverse direction as shown in FIG. 6A. At this time, in the case in which the thickness of the ceramic coating layer 3 for covering the outer peripheral portion of the first metallized layer 2a is smaller than that of the metal plated layer 4, the side portion of the metal plated layer 4 is overhung in the transverse direction so that the metal plated layer 4 is formed to cover the ceramic coating layer 3. When the conductive layer 2c is then formed by a sputtering method, therefore, there is generated a portion to be a shade in which a metal atom flying from above in a vertical direction is disturbed by the side portion of the metal plated layer 4 and does not reach the lower side of the metal plated layer 4. Consequently, the conductive layer 2c is hard to be formed as a continuous film surface from the upper surface of the metal plated layer 4 to the upper surface of the ceramic coating layer 3 therearound. For this reason, there is a possibility that the electrolyte B-4 to permeate into this portion might easily reach the first metallized layer 2a, thereby corroding the first metallized layer 2a.

Accordingly, it is preferable that the thickness of the ceramic coating layer 3 for covering the outer peripheral portion of the first metallized layer 2a should be set to be greater than that of the metal plated layer 4. As shown in FIG. 6B, consequently, an edge of the metal plated layer 4 is provided along that of the ceramic coating layer 3 and the metal plated layer 4 and the ceramic coating layer 3 are formed in contact with each other.

In the embodiment of the invention-shown in FIGS. 1A and 1B and FIGS. 3A and 3B, moreover, it is preferable that the ceramic coating layer 3 should be formed of sintered Al$_2$O$_3$ and should have a thickness of 3 μm or more.

In this case, it has been experimentally confirmed that the ceramic coating layer 3 forms a flat crystal in such a manner that the contained Al$_2$O$_3$ particles are mainly continuous with each other in a transverse direction depending on a temperature in firing. At this time, approximately several to several tens of crystals are fused with each other depending on the firing temperature. In the case in which the thickness of the ceramic coating layer 3 is set to be 3 μm or less, an overlap of a flat crystal having an average particle size of 1 to 3 μm which constitutes a layer is formed as a single layer or is not formed at all. Therefore, there is a possibility that a defect might be generated on the ceramic coating layer 3. As a result, there is generated a drawback that the electrolyte B-4 might penetrate to damage the first metallized layer 2a in some cases. Accordingly, it is preferable that the ceramic coating layer 3 should be formed of sintered $Al_2O_3$ and should have a thickness of 3 μm or more.

Moreover, it is preferable that the thickness of the ceramic coating layer 3 should be equal to or smaller than 15 μm. When the thickness is greater than 15 μm, an almost vertical step is easily formed on the side surface of the ceramic coating layer 3 in a portion in which the edge end of the ceramic coating layer 3 intersects the surface of the first metallized layer 2a. Consequently, the conductive layer 2c formed on the almost vertical step surface by evaporation or sputtering is hard to have a sufficient thickness. In some cases, accordingly, the defect of the conductive layer 2c is generated, for example, the conductive layer 2c is broken or extremely thinned in this portion. As a result, there is generated a drawback the electrolyte B-4 enters this portion, resulting in the corrosion of the first metallized layer 2a in some cases.

In the case in which the ceramic coating layer 3 is formed of sintered $Al_2O_3$, moreover, a glassy layer is formed on the surface of the ceramic coating layer 3. The glassy layer is generated by a reaction of a sintering assistant such as $SiO_2$, MaO or CaO to $Al_2O_3$, and contains an Al element as a component of a glass. Therefore, the glassy layer is hard to be corroded by the electrolyte B-4.

In the embodiment of the invention shown in FIGS. 1A and 1B and FIGS. 3A and 3B, moreover, it is preferable that the ceramic coating layer 3 should be composed of a plurality of layers. By this structure, the overlap of the flat crystal having an average particle size of 1 to 3 μm which constitutes the ceramic coating layer 3 is formed in at least two layers. As a result, it is possible to form a protective layer having a high reliability which is further hard to be corroded by the electrolyte B-4. Thus, it is possible to effectively prevent the corrosion and elution of the first metallized layer 2a.

As shown in FIGS. 1A and 1B and FIGS. 3A and 3B, in the case in which the first metallized layer 2a is formed through the outside surface of the ceramic base 1, the ceramic paste may be applied to the upper surface of the first metallized layer 2a interposed between the bottom portion of the ceramic base 1 and the side wall 1b. Consequently, it is possible to reliably prevent the delamination of the bonding portion of the bottom portion of the ceramic base 1 to the side wall 1b.

The conductive layer 2c is formed on the bottom face facing the hollow or open portion 1a by a well-known sputtering method in order to cover the extended portion 2a-B in which the first metallized layer 2a is exposed by the non-forming portion 3a of the ceramic coating layer 3 and the surrounding ceramic coating layer 3. It is preferable that the electrical connection of the conductive layer 2c and the first electrode C should be carried out through the first metallized layer 2a and the first connecting conductor 2a-A and the exposed part of the extended portion 2a-B should have a minimum area which can achieve the object of an electrical connection to the positive electrode (or the first polarizable electrode) B-1. By minimizing the area of the extended portion 2a-B, it is possible to reduce a possibility that a pinhole might be formed on the conductive layer 2c in the upper part of the extended portion 2a-B of the first metallized layer 2a even if the conductive layer 2c has a defect such as the pinhole. Consequently, it is possible to reduce a possibility that the first metallized layer 2a is damaged by the electrolyte B-4. It is apparent that the extended portion 2a-B may be formed in order to cover the whole bottom face facing the hollow or open portion 1a.

In the embodiment of the invention shown in FIGS. 1A and 1B and FIGS. 3A and 31B, moreover, it is preferable that the conductive layer 2c should be composed of at least one metal selected from aluminum (Al), zinc (Zn), or stainless steel (SUS) and titanium (Ti). By this structure, the first metallized layer 2a provided on the bottom face facing the hollow or open portion 1a is covered with the conductive layer 2c and the ceramic coating layer 3 and is thus protected from the electrolyte B-4. Accordingly, the first metallized layer 2a can be prevented from being corroded and the component can be hindered from being eluted into the electrolyte B-4.

Furthermore, the conductive layer 2c is formed of a metal which is hard to be corroded by the electrolyte B-4. Therefore, it is possible to prevent the corrosion and elution of the first metallized layer 2a. Thus, the reliability of the ceramic container can be enhanced.

The conductive layer 2c may be composed of a metallic multilayer.

In the case in which a metal layer constituted by the same material as the conductive layer 2c is also formed on the surface of the second metallized layer 2b simultaneously with the formation of the conductive layer 2c, moreover, the second metallized layer 2b can also be hard to be corroded by the electrolyte B-4.

The conductive layer 2c is formed in a thickness of 0.2 to 50 μm through a vacuum evaporation method or a sputtering method by adsorbing a masking member formed of SUS by a magnetic force to mask the side surface facing the hollow or open portion 1a (the inner side surface of the side wall 1b) in order to expose a predetermined range of the bottom face facing the hollow or open portion 1a, thereby preventing the conductive layer 2c facing the hollow or open portion 1a and the second metallized layer 2b from being conducted to each other, for example. The conductive layer 2c may be composed of a metallic multilayer and at least one metal selected from among Al, Zn or an alloy containing these metals as main components, Au, SUS and Ti may be provided on an uppermost layer.

In some cases in which the thickness of the conductive layer 2c is smaller than 0.2 μm, there is generated a portion in which the edge of the ceramic coating layer 3 cannot be perfectly covered in a sufficient thickness and the same edge cannot be perfectly covered with the continuous film surface of the conductive layer 2c from the surface of the extended portion 2a-B of the first metallized layer 2a to the surface of the ceramic coating layer 3. Consequently, there is a possibility that the first metallized layer 2a might be corroded by the electrolyte B-4 used in the battery or the electric double layer capacitor. In the case in which the thickness of the conductive layer 2c is greater than 50 μm, moreover, there is generated a drawback that a very long time is required for the formation.

Since Al, Zn or the alloy containing these metals as the main components, Au and SUS are hard to be eluted into the electrolyte B-4 of an organic solvent type, they are suitable for the conductive layer 2c in the battery B or the electric double layer capacitor B. Moreover, it is preferable to use a metal containing Al as a main component and 0.5 to 10% of silicon (Si). By using an Al—Si alloy containing Al as a main component, it is possible to increase a bonding strength to a conductive material E such as a fluororesin containing a carbon particle and to strongly bond the positive electrode B-1 or the polarizable electrode to the conductive layer 2c, and furthermore, to obtain an excellent electrical connection.

In the embodiment of the invention shown in FIGS. 1A and 1B and FIGS. 3A and 3B, moreover, it is preferable that the conductive layer 2c should be constituted by any of layers obtained by laminating a Ti layer on an Al layer, layers obtained by laminating an Al layer on a Ti layer and layers obtained by sequentially laminating an Al layer and a Ti layer on another Ti layer. Namely, the conductive layer 2c is realized by one of the following three constitutions each of which is composed of an aluminum layer and a titanium layer. As a first constitution, the conductive layer 2c is composed of an aluminum layer. As a second constitution, the conductive layer 2c is composed of a titanium layer and an aluminum layer laminated on the titanium layer. As a third constitution, the conductive layer 2c is composed of a first titanium layer, an aluminum layer laminated on the first titanium layer, and a second titanium layer laminated on the aluminum layer. The metal which is hard to be corroded by the electrolyte B-4 is formed like layer so that the conductive layer 2c is formed. In the case in which the Al layer is corroded by the electrolyte B-4, moreover, the corrosion progresses granularly. On the other hand, in the case in which the Ti layer is corroded by the electrolyte B-4, the corrosion progresses like a column. Even if the conductive layer 2c is corroded, therefore, the ways of the progress of the corrosion are different between the Al layer and the Ti layer so that the progress of corrosion up to the first metallized layer 2a is made difficult. Accordingly, it is possible to effectively prevent the corrosion and elution of the first metallized layer 2a. Thus, the reliability of the ceramic container can be enhanced very greatly. In particular, it is preferable to have a three-layer structure in which the Al layer and the Ti layer are sequentially laminated on the other Ti layer. Particularly, the reliability can be enhanced.

The conductive layer 2c functions as an internal electrode (a collector) to be connected to the battery element constituted by the positive electrode B-1, the negative electrode B-2, the separator B-3 and the electrolyte B-4 or the electric double layer capacitor element constituted by the two polarizable electrodes B-1 and B-2, the separator B-3 and the electrolyte B-4.

Next, the battery B or the electric double layer capacitor B according to the invention will be described below in detail. FIG. 7 is a sectional view showing the battery B or the electric double layer capacitor B according to another embodiment of the invention, illustrating an example of the case in which the ceramic container shown in FIGS. 3A and 3B is used. Reference symbol B-1 denotes a positive electrode (or a polarizable electrode (a first polarizable electrode)), reference symbol B-2 denotes a negative electrode (or a polarizable electrode (a second polarizable electrode)), reference symbol B-3 denotes a separator, reference symbol B-4 denotes an electrolyte, reference numeral 5 denotes a lid-attached to the upper surface of the side wall 1b in order to cover the hollow or open portion 1a, and reference symbol B denotes the battery or the electric double layer capacitor.

The battery B according to the invention accommodates a battery element constituted by the positive electrode B-1 connected electrically to the conductive layer 2c covering the bottom face facing the hollow or open portion 1a of the ceramic container, the negative electrode B-2 mounted on an upper surface of the positive electrode B-1 interposing the separator B-3 impregnated with the electrolyte B-4, and the electrolyte B-4, and furthermore, the lid 5 is placed to abut on an upper surface of the negative electrode B-2 and is brazed to the upper surface of the side wall 1b in order to close an opening portion of the hollow or open portion 1a. The lid 5 has at least a lower surface which is conductive and is electrically connected to the negative electrode B-2 in abutment on the negative electrode B-2, and furthermore, is bonded to the upper surface of a frame-shaped member or the upper surface of the second metallized layer 2b directly by means of a brazing material so that the negative electrode B-2 and the second metallized layer 2b are electrically connected to each other.

While FIG. 7 shows the example in which the positive electrode B-1 is provided to cover the conductive layer 2c and the negative electrode B-2 is provided to cover the positive electrode B-1 interposing the separator B-3, the negative electrode B-2 may be provided to cover the conductive layer 2c and the positive electrode B-1 may be provided to cover the negative electrode B-2 interposing the separator B-3.

Moreover, the electric double layer capacitor B according to the invention accommodates a electric double layer capacitor element constituted by the first polarizable electrode B-1 connected electrically to the conductive layer 2c covering the bottom face facing the hollow or open portion 1a of the ceramic container, the second polarizable electrode B-2 mounted on the upper surface of the first polarizable electrode B-1 interposing the separator B-3 impregnated with the electrolyte B-4, and the electrolyte B-4, and furthermore, the lid 5 is placed to abut on the upper surface of the second polarizable electrode B-2 and is brazed to the upper surface of the side wall 1b in order to close the opening portion of the hollow or open portion 1a. The lid 5 has at least a lower surface which is conductive and is electrically connected to the second polarizable electrode B-2 in abutment on the second polarizable electrode B-2, and furthermore, is bonded to the upper surface of a frame-shaped member or the upper surface of the second metallized layer 2b directly by means of a brazing material so that the second polarizable electrode B-2 and the second metallized layer 2b are electrically connected to each other.

In the battery B or the electric double layer capacitor B shown in FIG. 7, the conductive layer 2c and the positive electrode (the first polarizable electrode) B-1, and the negative electrode (the second polarizable electrode) B-2 and the lid 5 may be electrically connected to each other through the conductive material E such as a carbon paste constituted by containing a carbon particle in a resin. The conductive material E is obtained by dispersing carbon powder into a fluororesin, for example, and has a high conductivity by a mutual contact of the carbon powder.

By this structure, the conductive layer 2c and the positive electrode (the first polarizable electrode) B-1, and the negative electrode (the second polarizable electrode) B-2 and the lid 5 can be caused to elastically come in contact with each other, and they can be caused to reliably come in contact with each other in large areas respectively so that the reliability of the electrical connection can be enhanced more greatly. Moreover, the conductive layer 2c and the lid 5 are covered with the conductive material E so that they are also protected from the electrolyte B-4.

It is possible to obtain the battery B or the electric double layer capacitor B which uses the ceramic container according to the invention, has a high airtight reliability and is excellent in a mass production.

The positive electrode B-1 of the battery B takes a shape of a plate or a sheet containing a positive electrode active substance such as $LiCoO_2$ or $LiMn_2O_4$ and a conductive substance such as acetylene black or graphite, and the negative electrode B-2 takes a shape of a plate or a sheet containing a negative electrode active substance constituted by a carbon material such as coke or a carbon fiber.

The positive electrode B-1 and the negative electrode B-2 are fabricated by adding the conductive substance to the positive electrode active substance or the negative electrode active substance, and furthermore, adding and mixing a binder such as polytetrafluoroethylene polyvinylidene fluoride to form a slurry, molding the slurry like a sheet by using a well-known doctor blade method, and then, cutting the sheet to take a shape of a circle or a polygonal pyramid, for example.

Moreover, the separator B-3 is constituted by a nonwoven fabric formed of a polyolefin fiber or a fine porous film formed of polyolefin and is impregnated with the electrolyte B-4, and furthermore, is mounted between the positive electrode B-1 and the negative electrode B-2 so that a contact of the positive electrode B-1 with the negative electrode B-2 can be prevented and the electrolyte B-4 can be moved between the positive electrode B-1 and the negative electrode B-2.

The electrolyte B-4 of the battery B is obtained by dissolving a lithium salt such as lithium borate tetrafluoride into an organic solvent such as dimethoxyethane or propylene carbonate.

In the process for manufacturing the battery or the electric double layer capacitor, the lid 5 is bonded to crush the applied conductive material E. Therefore, a state in which a high conductivity is maintained is brought and a battery or an electric double layer capacitor having a high reliability can be constituted.

The first polarizable electrode B-1 and the second polarizable electrode B-2 in the electric double layer capacitor B according to the invention are obtained by, for example, carrying out carbonization and activation of a phenol resin fiber (a novoloid fiber). The activation is carried out by putting the fiber into contact with an activation gas such as a high-temperature steam in a high-temperature atmosphere of 800 to 1000° C., and the first polarizable electrode B-1 and the second polarizable electrode B-2 are fabricated in the process of gasifying volatile matters in a carbide or part of carbon atoms, and developing a fine structure having a size of 1 to 10 nm chiefly so that an internal surface area becomes $1 \times 10^6$ $m^2/kg$ or more. In the electric double layer capacitor B according to the invention, the first and second electrodes C and D have no polarity, and the first electrode C side can be used as an anode and the second electrode D side can be used as a cathode, and vice versa.

The electrolyte B-4 of the electric double layer capacitor B is obtained by dissolving a lithium salt such as lithium phosphate hexafluoride ($LiPF_6$) or a quaternary ammonium salt such as tetraethylammonium tetrafluoroborate (($C_2H_5$)$_4NBF_4$) into a solvent such as propylene carbonate (PC) or sulfolane (SLF).

Moreover, a porous resin having a heat resistance such as a glass fiber, polyphenylene sulfide, polyethylene terephthalate or polyamide is used for the separator B-3.

After the polarizable electrodes B-1 and B-2 and the separator B-3 are accommodated in the ceramic container, the electrolyte B-4 is injected from the opening portion of the hollow or open portion 1a into the ceramic container by using injecting means such as a syringe and the lid 5 is welded and bonded to the upper surface of the side wall 1b in airtightness after the injection. Consequently, it is possible to obtain the electric double layer capacitor a in which the inner part of the ceramic container is sealed in airtightness.

The electrolyte B-4 has a high corrosiveness and solubility. By using the ceramic container according to the invention, the ceramic base 1, the ceramic coating layer 3 and the conductive layer 2c are hard to damaged by the electrolyte B-4 containing an organic solvent or acid because of a high corrosion resistance to the electrolyte B-4, an impurity eluted from the ceramic container can be prevented from being mixed into the electrolyte B-4 to deteriorate the electrolyte B-4 so that the performance of the battery B or the electric double layer capacitor B can be maintained to be high.

The lid 5 is formed of a metal such as an Fe—Ni—Co alloy or an Al alloy. The lid 5 is mounted on the upper surface of the side wall 1b to cover the hollow or open portion 1a of the ceramic base 1, and is brazed with a brazing material as described above. Instead of the brazing, an Ni plated film and an Al film are previously provided on each surface of the lower surface of the lid 5 and the second metallized layer 2b, and the films are fused to each other by using a seam welding method for bonding the lid 5 by Joule heat generated by lightly pressing, rotating and moving a conducted roller along the edge of the upper surface of the lid 5 or an ultrasonic welding method. Consequently, the lid 5 is bonded onto the second metallized layer 2b provided on the upper surface of the side wall 1b so that the battery B or the electric double layer capacitor B is fabricated.

The lid 5 may be formed of an insulating material such as a ceramic plate. In this case, the lid 5 is fabricated in such a manner that at least a lower side principal surface thereof is conductive. Consequently, the lid 5 functions as the other internal electrode (collector) of the battery B or the electric double layer capacitor B.

In the case in which the lid 5 is formed of Al and the ultrasonic welding method is employed for bonding to the ceramic base 1 in which the Al layer is formed on the second metallized layer 2b, moreover, the lid 5 is bonded to the Al layer provided on the second metallized layer 2b in a state in which the Ni plated film is hardly fused. More specifically, the lid 5 and the ceramic container are bonded to each other through Al. Consequently, it is possible to obtain a bonding portion which is greatly hard to be corroded by the electrolyte B-4.

By this structure, it is possible to form, on the surface, a passive film in which the bonding portion of the second metallized layer 2b and the lid 5 is excellent in a corrosion resistance, and the same bonding portion can be prevented very effectively from being corroded by the electrolyte B-4 or the external atmosphere so that an airtight reliability in the battery B or the electric double layer capacitor B can be caused to be very excellent.

The lid 5 may be a plate member formed of Al, a plate member obtained by forming an Al layer on a lower surface of ceramics or a plate member formed of an Fe—Ni—Co alloy or an Ni—Co alloy which has the Al layer provided on a lower surface. Moreover, it is preferable that a convex portion (a portion protruded linearly) should be formed over the whole outer peripheral portion of the lower surface of the lid 5. In the Case in which the lid 5 is the plate member formed of Al, the convex portion is formed at the same time that the lid 5 is subjected to stamp out by a press machine or is provided to have a section taking a shape of a downward convex triangle in a height of approximately 0.1 mm, for example, by a so-called coining method after the blanking. The coining method is a method of constraining the side of a substance to be processed and restricting a relief for a thickness, and furthermore, superposing a metal mold having concavo-convex portions formed on a mold surface on a material to be processed and pressing them from above and below, thereby transferring a concavo-convex pattern of the metal mold onto the surface of the material to be processed.

In the case of the lid 5 composed of the plate member in which the Al layer is provided on the lower surface of the Fe—Ni—Co alloy, moreover, when the ingots of these metals are rolled to form a plate member having a thickness of 0.2 to 0.5 mm, for example, an Al plate having a thickness of 0.1 mm is clad bonded to surfaces, for example, and the convex portion is then formed by the coning method.

The convex portion formed in the outer peripheral portion of the lid 5 is caused to abut on the upper surface of the side wall 1*b* provided on the upper surface of the ceramic base 1 and the lid 5 is mounted thereon, and an ultrasonic wave of approximately several tens kHz is applied from the upper surface of the lid 5. Consequently, the convex portion formed on the lower surface of the lid 5 is bonded to the Al layer provided on the surface of the side wall 1*b* while the convex portion is crushed along the concavo-convex portions of the second metallized layer 2*b* provided on the upper surface of the side wall 1*b*. At this time, even in the case in which the upper surface of the side wall 1*b* of the ceramic base 1 warps or undulates, the bonding is carried out depending on a variation in the crushing size of the convex portion. According to the ultrasonic bonding method, it is possible to strongly bond the lid 5 without damaging an airtightness in the hollow or open portion 1*a*.

In more detail, the ultrasonic bonding method is executed in the following manner, for example. More specifically, the ultrasonic bonding method is carried out by setting the ceramic base 1 and the lid 5 which are bonding objects between a horn (an angular fixing table) having a chip to be a medium for a vibration in a lower part of a tip and an anvil (a metallic sheet), and applying a pressure of approximately 30 to 50N vertically through the chip, for example, and simultaneously applying an ultrasonic vibration of 15 to 30 kHz in a horizontal direction while moving continuously along the outer periphery of the lid 5. Moreover, it is also possible to execute a method of setting the shape of the chip to be linear to increase a pressure in a vertical direction, thereby carrying out a bond having a constant length in a short time.

In the ultrasonic bonding method, an oxide film and a soil on a surface of a bonding portion are pushed in an outward direction of the bonding portion in an initial stage in which an ultrasonic vibration is applied, and furthermore, Al crystal grains on the lid 5 and the side wall 1*b* approach each other to obtain an interatomic distance so that a mutual attraction acts between atoms and a strong bond can be thus obtained. At this time, a temperature which is equal to or lower than one third of a melting point of a metal in a normal metal fusing and bonding method is generated locally. By this extent of heat, the electrolyte B-4 is hardly degenerated. Consequently, it is possible to prolong the lifetime of the battery B or the electric double layer capacitor B.

According to the ultrasonic bonding method, furthermore, other metals in Al are rarely diffused. Accordingly, it is possible to form a bonding portion having a higher corrosion resistance to the electrolyte B-4.

The invention is not restricted to the examples of the embodiments but various changes can be made without departing from the scope of the invention. For example, while the description has been given on the assumption that the material of the ceramic base 1 of the ceramic container according to the invention is sintered $Al_2O_3$, the material may be formed of other ceramics such as sintered aluminum nitride (AlN) and glass ceramics. In the case in which the ceramic base 1 is formed of sintered AlN, it is possible to efficiently radiate heat in an operation to an outside.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description and all changes which come within the meaning and the range of equivalency of the claims are therefore intended to be embraced therein.

What is claimed is:

1. A ceramic container comprising:
    a ceramic base having a hollow or open portion for accommodating a battery element or an electric double layer capacitor element, defined by a bottom portion and a side wall which surrounds a bottom face of the bottom portion, the bottom face facing the hollow or open portion;
    a ceramic coating layer formed on a periphery of the bottom face along an inner face of the side wall;
    a metallized layer extending, on the bottom face, from a portion provided under the side wall to an inside of an inner end of the ceramic coating layer via a portion provided under the ceramic coating layer; and
    a conductive layer formed on the bottom face in order to cover an extended portion of the metallized layer and the ceramic coating layer.

2. The ceramic container of claim 1, wherein the ceramic coating layer is formed over a whole periphery of the extended portion from an outer peripheral portion of an upper surface of the extended portion to the bottom face in addition to the ceramic coating layer provided immediately under the side wall.

3. The ceramic container of claim 1, wherein the ceramic coating layer is formed of sintered alumina and has a thickness of 3 μm or more.

4. The ceramic container of claim 1, wherein the ceramic coating layer is composed of a plurality of layers.

5. The ceramic container of claim 1, wherein the conductive layer is formed of at least one metal selected from aluminum, zinc or an alloy containing these metals as main components, gold, stainless steel and titanium.

6. The ceramic container of claim 1, wherein the conductive layer is composed of an aluminum layer and a titanium layer laminated on the aluminum layer.

7. The ceramic container of claim 1, wherein the conductive layer is composed of a titanium layer and an aluminum layer laminated on the titanium layer.

8. The ceramic container of claim 1, wherein the conductive layer is composed of layers obtained by sequentially laminating an aluminum layer and a titanium layer on another titanium layer.

9. A battery comprising:
    the ceramic container of claim 1;
    a positive electrode;
    a negative electrode;
    a separator provided between the positive and negative electrodes;

an electrolyte; and a lid attached to an upper surface of the side wall in order to close the hollow or open portion, the positive electrode, the negative electrode, the separator and the electrolyte being accommodated in the hollow or open portion.

10. An electric double layer capacitor comprising:

the ceramic container of claim 1;

two polarizable electrodes;

a separator provided between the two polarizable electrodes;

an electrolyte; and a lid attached to an upper surface of the side wall in order to close the hollow or open portion, the two polarizable electrodes, separator and electrolyte being accommodated in the hollow or open portion.

* * * * *